United States Patent [19]

Hegeler et al.

[11] Patent Number: 5,521,944
[45] Date of Patent: May 28, 1996

[54] CIRCUIT FOR A DEMODULATOR FOR A RADIO DATA SIGNAL IN A RADIO RECEIVER

[75] Inventors: Wilhelm Hegeler, Hildesheim; Jurgen Kasser, Diekholzen; Detlev Nyenhuis, Sibbesse; Lothar Vogt, Hohenhameln, all of Germany

[73] Assignee: Blaupunkt-Werke GmbH, Hildesheim, Germany

[21] Appl. No.: 246,737

[22] Filed: May 20, 1994

[30]   Foreign Application Priority Data

Jun. 4, 1993 [DE]   Germany ................. 43 18 624.4

[51] Int. Cl.$^6$ .................................................. H04L 27/22
[52] U.S. Cl. ............................................ 375/329; 375/333
[58] Field of Search ................................ 375/322, 329, 375/333; 370/12, 122

[56]   References Cited

U.S. PATENT DOCUMENTS

| | | | |
|---|---|---|---|
| 3,949,401 | 4/1976 | Hegeler et al. | 455/57.1 |
| 4,584,534 | 4/1986 | Lijphart et al. | 375/329 |
| 4,635,279 | 1/1987 | Nossen | 375/322 |
| 4,888,793 | 12/1989 | Chanroo et al. | 375/329 |
| 5,175,507 | 12/1992 | Roither | 375/333 |
| 5,278,560 | 1/1994 | Hegeler et al. | 341/155 |
| 5,311,555 | 5/1994 | Ichiyoshi | 375/329 |

FOREIGN PATENT DOCUMENTS

| | | |
|---|---|---|
| 0195989A3 | 10/1986 | European Pat. Off. |
| 4029583A1 | 11/1991 | Germany. |

Primary Examiner—Stephen Chin
Assistant Examiner—Jeffrey W. Gluck
Attorney, Agent, or Firm—Frishauf, Holtz, Goodman, Langer & Chick

[57] ABSTRACT

In a circuit for a demodulator of a radio data signal in a radio receiver, the multiplex signal in digital form is mixed into the baseband, in two phase positions shifted 90° with respect to each other, after band-pass filtering, together with a reference carrier generated at a sampling clock rate produced in the radio receiver, thus producing a first and a second mix signal. A first and a second auxiliary signal with, respectively, a sine waveform and a cosine waveform are produced. The first mix signal is multiplied by the first auxiliary signal, and the second mix signal by the second auxiliary signal. The results of these multiplications are added together, producing a first output signal. The first mix signal is multiplied by the second auxiliary signal, and the second mix signal by the first auxiliary signal, and the results subtracted from each other, thus producing a second output signal. The phase position of the auxiliary signals is controlled in such a manner that the first output signal corresponds to the radio data signal (RDS) shifted down into the baseband.

15 Claims, 8 Drawing Sheets

CIRCUIT FOR A DEMODULATOR FOR A RADIO DATA SIGNAL IN A RADIO RECEIVER

Cross reference to related patents and applications, assigned to the assignee of the present invention:

U.S. Pat. No. 3,949,401, Hegeler et al;

U.S. Pat. No. 5,278,560, Hegeler;

U.S. application Ser. No. 08/164,127, filed Dec. 6, 1993, Bartels et al., now U.S. Pat. No. 5,483,694;

U.S. application Ser. No. 08/243,201, filed May 16, 1994, Hegeler, now U.S. Pat. No. 5,414,384;

U.S. application Ser. No. 08/243,203, filed May 16, 1994, Hegeler, now U.S, Pat. No. 5,457,423.

FIELD OF THE INVENTION

The invention relates generally to a circuit for a demodulator for radio data signals in a radio receiver, where transmission of the radio data signal is carried out through phase shifting of a suppressed auxiliary signal within a multiplex signal.

BACKGROUND

Various circuits for demodulating radio data signals that process analog signals are already known.

Some transmitters radiate a radio data signal (RDS) and traffic announcement signals, known as ARI signals. Other transmitters may radiate only radio data signals (RDS), while still others may only radiate ARI signals. Both the RDS and the ARI signals are radiated with a carrier signal of 57 kHz. For RDS signals, the carrier is suppressed. A receiver, thus, may receive a multiplex signal from one transmitter or, depending on its physical location, a mix of RDS and ARI signals, or only RDS, or only ARI signals. The receiver, thus, must be capable of recognizing the three possibilities, and distinguishing between the three signals, whether they occur separately or simultaneously.

THE INVENTION

It is an object of this invention to facilitate demodulation of a multiplex signal which includes a radio data signal (RDS), which is preferably, present in digital form, by means of digital circuitry, in an advantageous manner.

In one embodiment of the circuit according to the invention, the multiplex signal in digital form is mixed into the baseband, in two phase positions shifted 90° with respect to each other, after band-pass filtering together with a reference carrier generated at a sampling clock rate produced in the radio receiver, thus producing a first and a second mix signal. A first and a second auxiliary signal with a sine and a cosine waveform are produced, and the first mix signal is multiplied by the first auxiliary signal, and the second mix signal by the second auxiliary signal. The results of these multiplications are added together producing a first output signal. The first mix signal is multiplied by the second auxiliary signal and the second mix signal by the first auxiliary signal and the results subtracted from each other, thus producing a second output signal.

The phase position of the auxiliary signals is controlled in such a manner that the first output signal corresponds to the radio data signal (RDS) shifted down into the baseband.

A significant advantage of the circuit according to the invention is that the reference carrier is coupled to the sample clock rate generated for digital processing. This results in significant simplifications in designing the digital circuit, for instance the possibility of loading the sampling values of the reference carrier from a stored table.

The circuit according to the invention is also suited for demodulation of a traffic announcement (ARI), or broadcast signal, with an amplitude modulated, not suppressed carrier, that has a phase position shifted 90° with respect to the auxiliary carrier, of radio data signals (RDS).

With the circuit according to the invention, a reduction in the need for calculations is achieved by the reference carrier being present as a $0, 1, 0, -1 \ldots$ order of numbers for a sine phase position and as a $1, 0, -1, 0 \ldots$ order of numbers for a cosine phase position.

In accordance with a feature of the invention, the second output signal produces a traffic broadcast signal (ARI) in the baseband. In this manner, in addition to the radio data signal (RDS) a traffic announcement (ARI) signal, if present, is shifted to the baseband.

In accordance with another embodiment, the phase position of the auxiliary signals is controlled by passing, the first, the second, and a third output signal, which third output signal has been generated by multiplying the first by the second output signal, through low-pass filters. The first and the second low-pass filtered output signals are multiplied by each other and the multiplied result subtracted from the low-pass filtered third output signal. The result of the subtraction is passed through a threshold circuit, to provide a control voltage for a generator producing the auxiliary signals.

This is a particularly advantageous way of controlling the phase position of the auxiliary signals. Preferably, the result of the multiplication of the first and the second output signals, after passed through the low-pass filter, and prior subtraction, is multiplied by a constant.

To produce the auxiliary signals for the purposes of this invention, a circuit can be used that may also be used in an advantageous manner outside the primary field of the invention as well. This is the circuit for generating at least one periodic signal with a waveform dependent on a supplied control signal which can assume two levels. This circuit is characterized by incrementing, or decrementing, depending on the level of the control signal, the content of a register by clock signals which recur at a frequency which is significantly higher then the frequency of the generated signal. A function value is calculated from the respective content of the register, where the value range, which the content of the register can assume, corresponds to half a period of the signal to be generated. The sign of the calculated function value is changed at each overflow and underflow of the register.

For purposes of the circuit according to the invention, among other things, the circuit for producing at least one periodic signal can be altered in such a way, that the prescribed waveform is sine-shaped, and that a cosine-shaped additional signal is produced, and that the function values are calculated using polynomials.

A second embodiment of the circuit according to the invention is characterized by the sampling values of the radio data signal (RDS), shifted down into the baseband, and one signal of a mixed signal being summed for the duration of one period of the RDS signal. The absolute value of the summed up sampling values are produced, and the difference of the absolute values at a preset moment are used for controlling the 180° phase correction. This embodiment constitutes an advantageous possibility for demodulating the radio data signal that has already been shifted down into the baseband.

Advantageously, the summed sampling values of the mix signal are used to generate the demodulated radio data signal (RDS).

Also advantageously, recognition of a 180° error is carried out with an integrator, whose counting direction is determined by the difference of the absolute values and which causes a 180° phase correction when overflow occurs.

DRAWINGS

Further features of the embodiments will be apparent from the drawings, of which:

FIG. 1 shows a demodulator for radio data (RDS) and for traffic announcement (ARI) signals, FIG. 2 shows a mixer contained in a demodulator according to FIG. 1, FIG. 3 shows a phase control loop contained in a demodulator according to FIG. 1, FIG. 4 shows a sine/cosine generator for the phase control loop according to FIG. 3, FIG. 5 shows a circuit for calculating polynomials for the generator according to FIG. 4, FIG. 6 shows a demodulator for radio data signals as part of the demodulator circuit according to FIG. 1, FIG. 7 shows a circuit for orthogonal transformation, and FIG. 8 shows a demodulator for traffic announcement signals as part of the demodulator circuit according to FIG. 1.

The same components are designated with the same reference characters in each drawing figure. Though the embodiment as well as parts thereof are shown as block diagrams, this does, however, not indicate that the circuit subject to the invention is limited to be being implemented with individual circuits corresponding to these blocks. Rather, the circuit according to the invention can be implemented in particularly advantageous manner with highly integrated circuits. For instance, digital signal processors can be employed that, if programmed accordingly, can carry out the processing sequences shown in the block diagrams. As part of an integrated circuit, the circuit according to the invention, in conjunction with other circuits can constitute a significant portion of a radio receiver.

DETAILED DESCRIPTION

Figure 1:
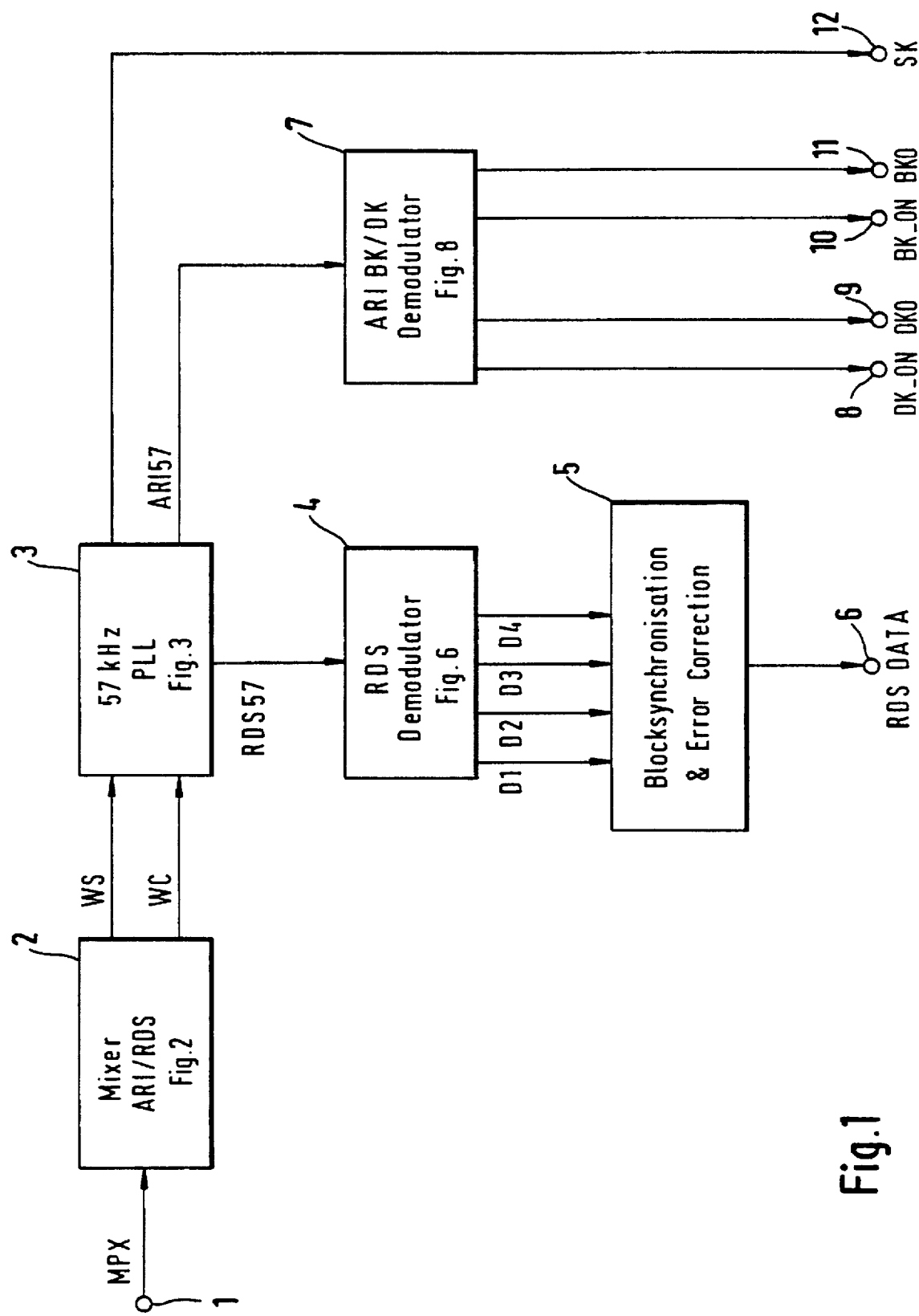

Input 1 of the demodulator circuit according to FIG. 1 is supplied with a multiplex signal that contains, in addition to the audio information, a traffic broadcast signal (ARI), a radio data signal (RDS), or both signals, depending on the station being received. The traffic broadcast signal (ARI) consists of a known amplitude modulated subcarrier with a frequency of 57 Khz. For radio data signal (RDS) transmission, phase shifting of a suppressed subcarrier with a usual broadcast frequency of 1187.5 Hz is carried out.

The supplied multiplex signal MPX first reaches a mixer 2, where it is multiplied by a reference carrier, generated at a sampling clock rate generated in the radio receiver, into two phase positions shifted 90° with respect to each other. This results in mix signals ws and wc. Since the reference carrier is not coupled to the subcarrier, the mix signals ws, wc are prone to exhibit errors that arise through the changing phase position between the reference carrier and the subcarrier. To correct this error, a phase control loop 3 is provided.

With mixer 2 and phase control loop 3, the radio data and traffic broadcast signals with the frequency of the carrier are shifted down into the baseband. Through a special design of the phase control loop, a separation of the traffic announcement, or broadcast signals ARI (Trademark Reg. No. 1,282, 281 of Blaupunkt) from the radio data signals RDS, is carried out at the same time.

The RDS signal is demodulated in an RDS demodulator 4, whose output signals D1 through D4 are supplied to a circuit 5 for block synchronization and error correction. Output (6) of this circuit carries the RDS data.

The ARI signal is demodulated in a traffic broadcast demodulator 7. For region recognition BK (in German: BereichsKennung) and for announcement recognition DK (in German: DurchsageKennung), signals are generated that indicate the presence of such recognition (BK—ON, BK0, DK—ON, DK0). These signals can be picked up at outputs 8, 9, 10, 11. If the subcarrier is present, a signal SK, which recognizes stations that carry traffic announcements, is generated as well in phase control loop 3. This signal can be picked up at output 12.

Figure 2:
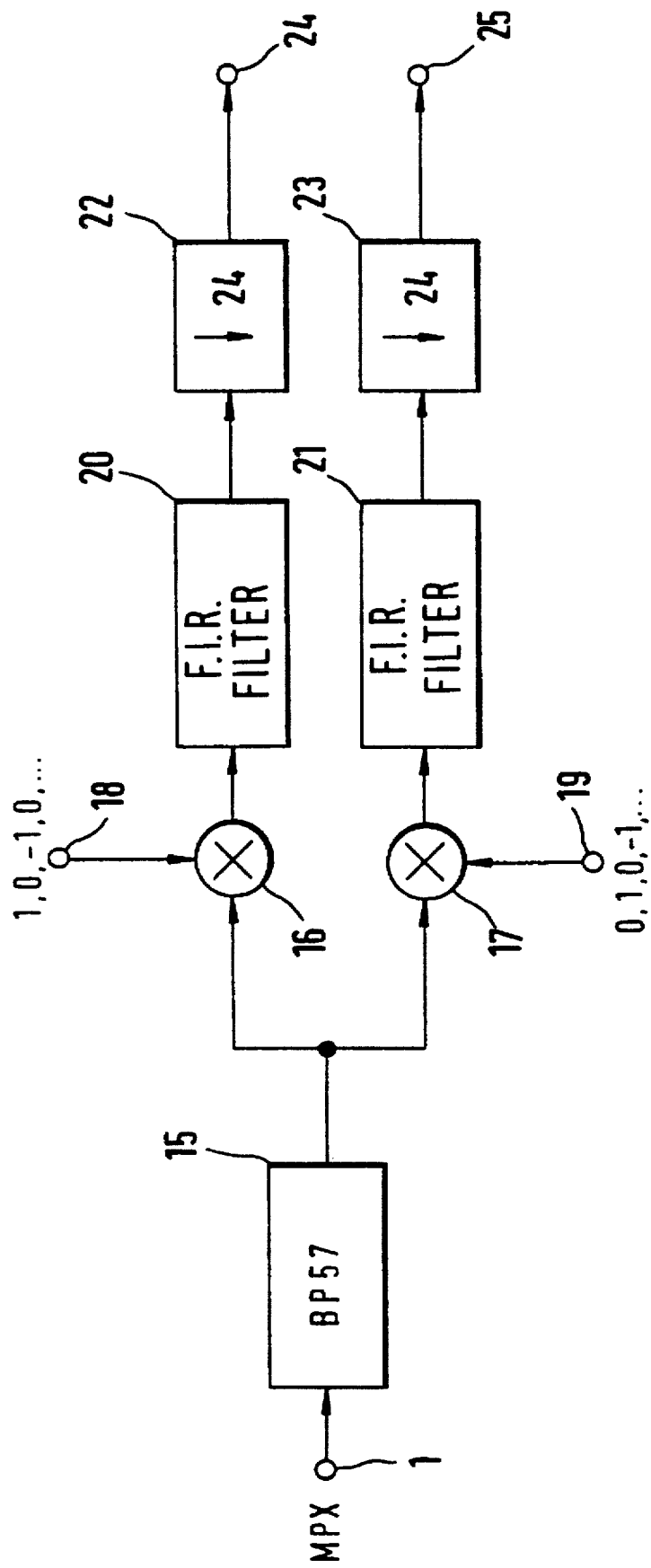

FIG. 2 shows the mixer 2 (FIG. 1) in detail. First, a band-pass filter 15, which passes on the spectral components of the multiplex signal MPX that fall within the range of the modulated subcarrier, is connected to input 1. The size of the bandwidth is such, that sufficient suppression of the multiplex signal and of other disturbing portions of the signal is accomplished. Band-pass filter 15 is followed by two multipliers 16, 17 that are supplied with, in addition to the output signal of the band-pass filter 15, one reference carrier each, which is derived from a clock signal generated in the radio receiver. These carriers have a frequency of 57 kHz, but are not coupled to the subcarrier. To simplify mathematical operations, it is advantageous that the multiplex signal here has a sampling frequency of 228 khz. The sampling values of the reference carriers supplied at 18, 19 can consist of a numerical sequence of $1, 0, -1, 0$, or $0, 1, 0, -1$, respectively for one period each of the reference carrier.

In the following filters, that are devised as FIR (Finite Impulse Response) filters, mix products of higher frequency are suppressed, leaving only the baseband. In addition, a subsequent sampling rate reduction by a factor of 24 is made possible in dividers 22, 23 by the filters 20, 21. This allows subsequent signal processing steps to be carried out at a lower speed. The mix signals wc and ws are received at 24, 25 and supplied to the phase control loop 3 (FIG. 1, FIG. 3).

Figure 3:
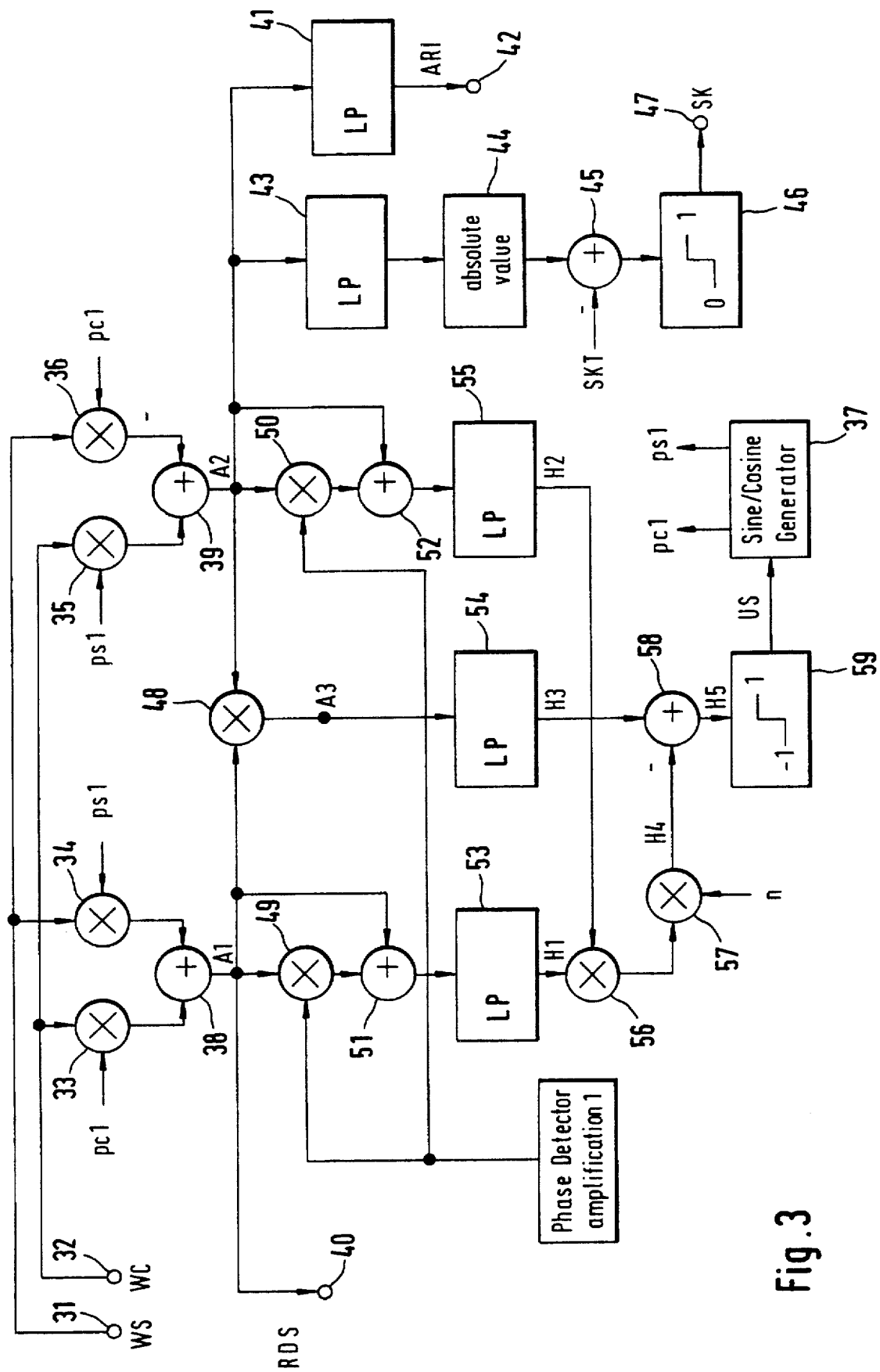

FIG. 3 illustrates that the mix signals ws and wc supplied to inputs 31, 32 of the phase control loop are each multiplied by a sine-shaped auxiliary signal ps1 and an auxiliary signal pc1, shifted 90° with respect to ps1 using one of the multipliers 33, 34, 35, 36. The auxiliary signals are produced in a sine/cosine generator 37. The output signals of multipliers 33, 34 are added at 38, while the output signals of multipliers are subtracted at 39. Using the phase shift control described below, the radio data signal, which was shifted down into the baseband, is available at output 40 of adder 38, while the radio broadcast signal, which was shifted down into the baseband, can be picked up at terminal 42 from the output of subtractor 39 via a low-pass filter 41.

Signal SK is derived by using another low-pass filter 43, an absolute value generator 44, a subtractor 45 which, by signal SKT, sets a threshold level for comparison with the absolute value obtained from generator 44, and a threshold circuit 46. The signal SK is derived from the amplitude of the output signal at subtractor 39. This signal SK is available at output 47 and indicates stations with traffic broadcasting.

Following is a description of the control for the sine/cosine generator 37, shown at the bottom of FIG. 3, using output signals A1 and A2 of adders 38, 39. First, a multiplier 48 is used to generate an additional signal A3. The additional multipliers 49, 50 and adders 51, 52 for signals A1 and A2 are used to control loop amplification and thus, the transient behavior. Higher frequency components are removed from signals A1, A2, A3 with respective low-pass filters 53, 54, 55. Output signals H1, H2 of low-pass filters 53, 55 are multiplied by each other multiplier 56 and the result multiplied by a constant n, e.g. 2, at 57. The result of this multiplication is subtracted from the output signal H3 of low-pass filter 54 at 58. A signal US, which controls the sine/cosine generator 37, is generated via a threshold circuit 59. The constant n is a natural number. The use of n=2 is automatically derived from the geometrical formula $\sin(2\phi)=2\sin(\phi)\cos(\phi)$, when considered in connection with the formulae for H1, H2, H4, referred to below.

Signals A1 and A2 have the following form:

$$A1 = r \cdot \cos(phi) - a \cdot \sin(phi)$$

$$A2 = r \cdot \sin(phi) + a \cdot \cos(phi),$$

where phi is the phase error of the input signal $r \cdot \cos(2\pi 57 \text{ kHz} + phi) + a \cdot \sin(2\pi 57 \text{ kHz} + phi)$, r is the RDS modulation, and a is the traffic announcement (ARI) modulation.

The task of the phase detector is to generate, from signals A1 and A2, a signal which is proportional to the phase error, for controlling the sine/cosine generator 37. Signal A3 is also used for this task. Signal A3 is a result of the multiplication of A1 by A2 and appears as follows:

$$A3 = A1 \cdot A2 = 0.5 \cdot [r^2 - a^2] \cdot \sin(2 \cdot phi) + [r \cdot a \cdot \cos(2 \cdot phi)]/2$$

Hereafter, the output signals of low-pass filters 53, 55 are named H1 and H2. The limit frequency of low-pass filters 53, 55 is selected in such a way that the RDS spectral components are suppressed, that is:

$$H1 = -a \cdot \sin(phi); \quad H2 = a \cdot \cos(phi).$$

Correspondingly, the limit frequency of low-pass filter 54 is selected in such a way that signal H3 takes the following shape:

$$H3 = 0.5 \cdot [r^2 - a^2] \cdot \sin(2 \cdot phi).$$

Signal H4 is then $H4 = -a^2 \sin(2 \cdot phi)$.

The control signal H5 for the sine/cosine generator 37 is then calculated as $$H5 = 0.5 \cdot [r^2 + a^2] \cdot \sin(2 \cdot phi).$$

This control signal H5 controls the sine/cosine generator independently of the sign of the modulation. Three scenarios are possible: both a traffic announcement signal (RDS) and radio data signal (ARI), or just one of the signals RDS or ARI may be received. The following equations show that in all cases the sine/cosine generator is controlled only by the phase error phi or by $\sin(2 \cdot phi)$.

RDS+traffic announcement: $H5 = 0.5 \cdot [r^2 + a^2] \cdot \sin(2 \cdot phi)$

Figure 4:
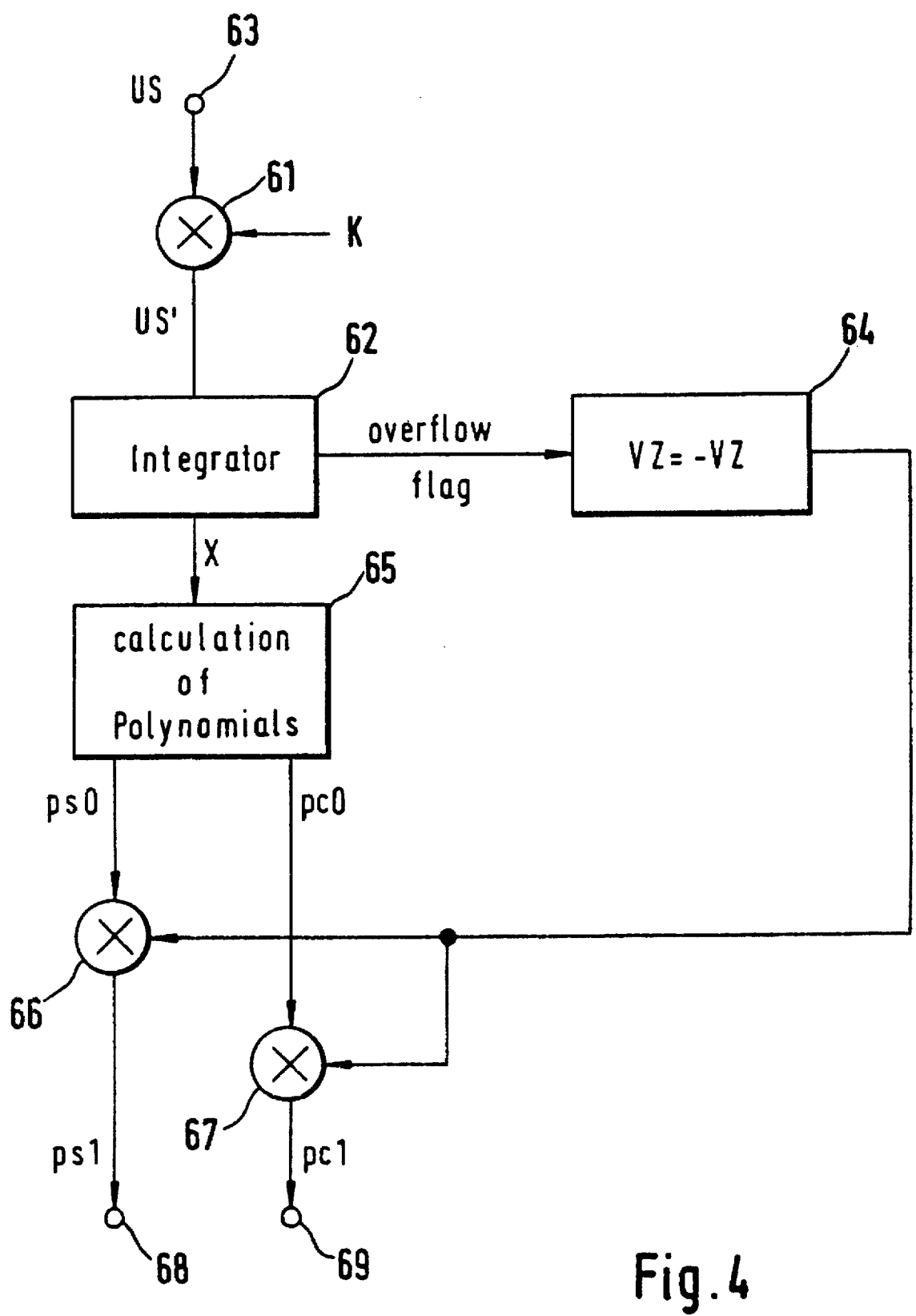

RDS only: $H5 = 0.5 \cdot r^2 \cdot \sin(2 \cdot phi)$ traffic announcement only: $H5 = 0.5 \cdot a^2 \cdot \sin(2 \cdot phi)$ FIG. 4 shows an advantageous embodiment of the sine/cosine generator 37 (FIG. 3). An integrator 62 integrates the control signal US that was fed in at 63. It merely represents the sign, and can assume the values −1 and +1, for instance. Scaling in such a fashion, that US' becomes significantly smaller than the integration or count range of integrator 62, is accomplished through multiplication with a factor K at 61. Integrator 62 is a register, which is incremented or decremented by clock signals depending on the sign US, and continues at the respective other end of the count range when going above or below the count range. In this process, an overflow signal is produced that causes a change in the sign VZ at 64.

The respective content x of integrator 65 is supplied to a circuit 65 for calculating polynomials, which closely approach the desired sine and cosine functions. Outputs of circuit 65 are provided with multipliers 66, 67 for multiplying the respective calculated values ps0, pc0 by the sign VZ. The sine wave signal ps1 and cosine wave signal pc1 can be obtained at outputs 68, 69. Because a sign change of the calculated values is effected at every overflow of the integrator, the integrator value range can be identified through reproduction and scaling of the polynomial coefficients with the definition interval $[-\pi/2, \pi/2]$ for the polynomials.

Figure 5:
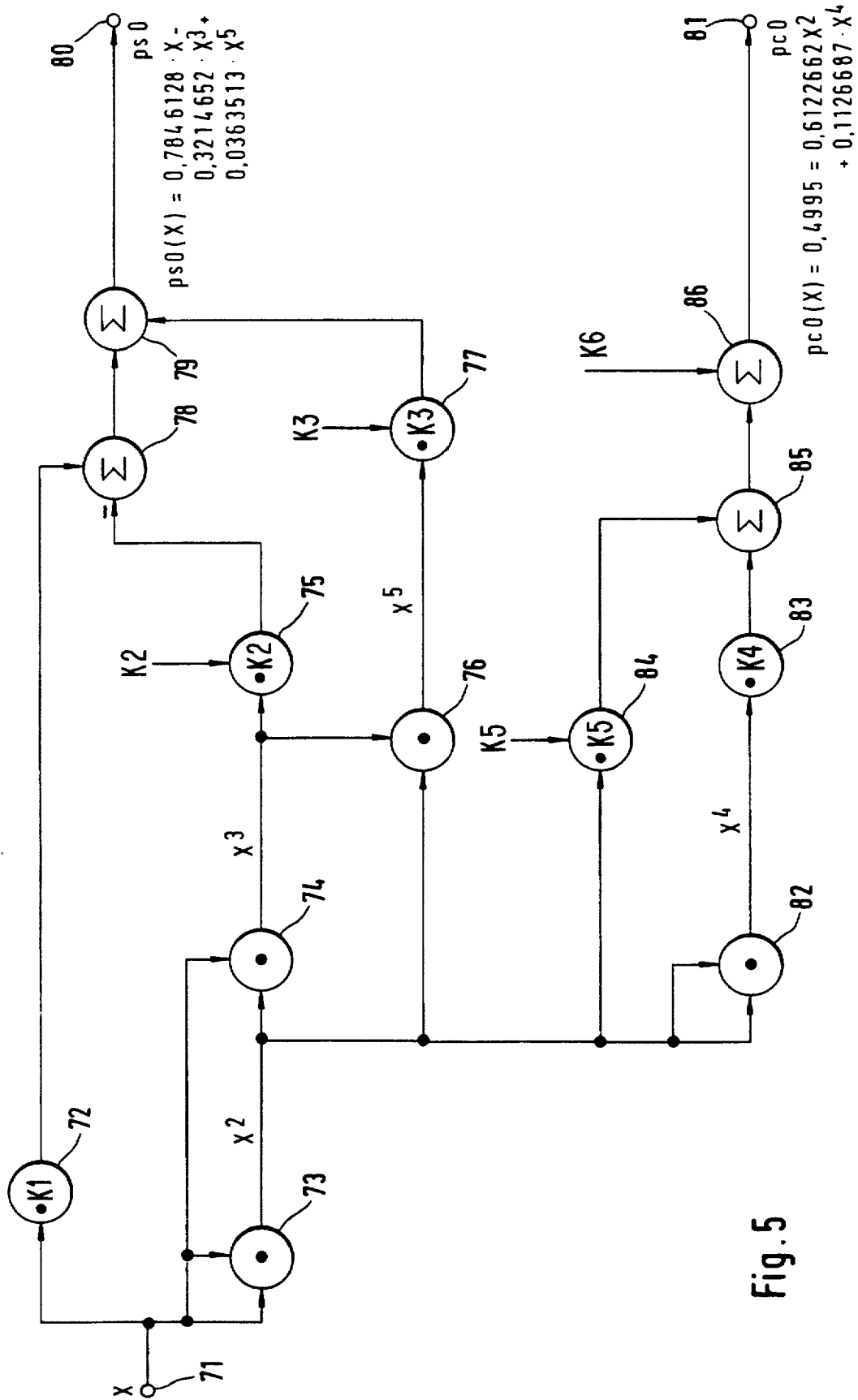

An embodiment for the box 65 calculation of the polynomials is shown in FIG. 5. The integrator content x is applied at 71, multiplied at 72 by a first coefficient, at 73 by itself, and at 74 by the result of the multiplication at 73. The result $x^3$ of the multiplication at 74 is multiplied by a second coefficient K2 at 75, and by $x^2$ at 76, providing at the output of multiplier 76 $x^5$, which is multiplied with the third coefficient K3 at 77. Using two adders 78, 79, the polynomial ps0 is formed, which can be obtained at output 80.

To generate the polynomial pc0, which can be obtained at another output 81, $x^4$ is formed through multiplication of $x^2$ by itself at 82. $x^4$ is multiplied by a coefficient K4 at 83. $x^2$ is multiplied by another coefficient K5 at 84. The sum of these generated polynomial and a constant K6 is formed using adders 85 and 86.

Figure 6:
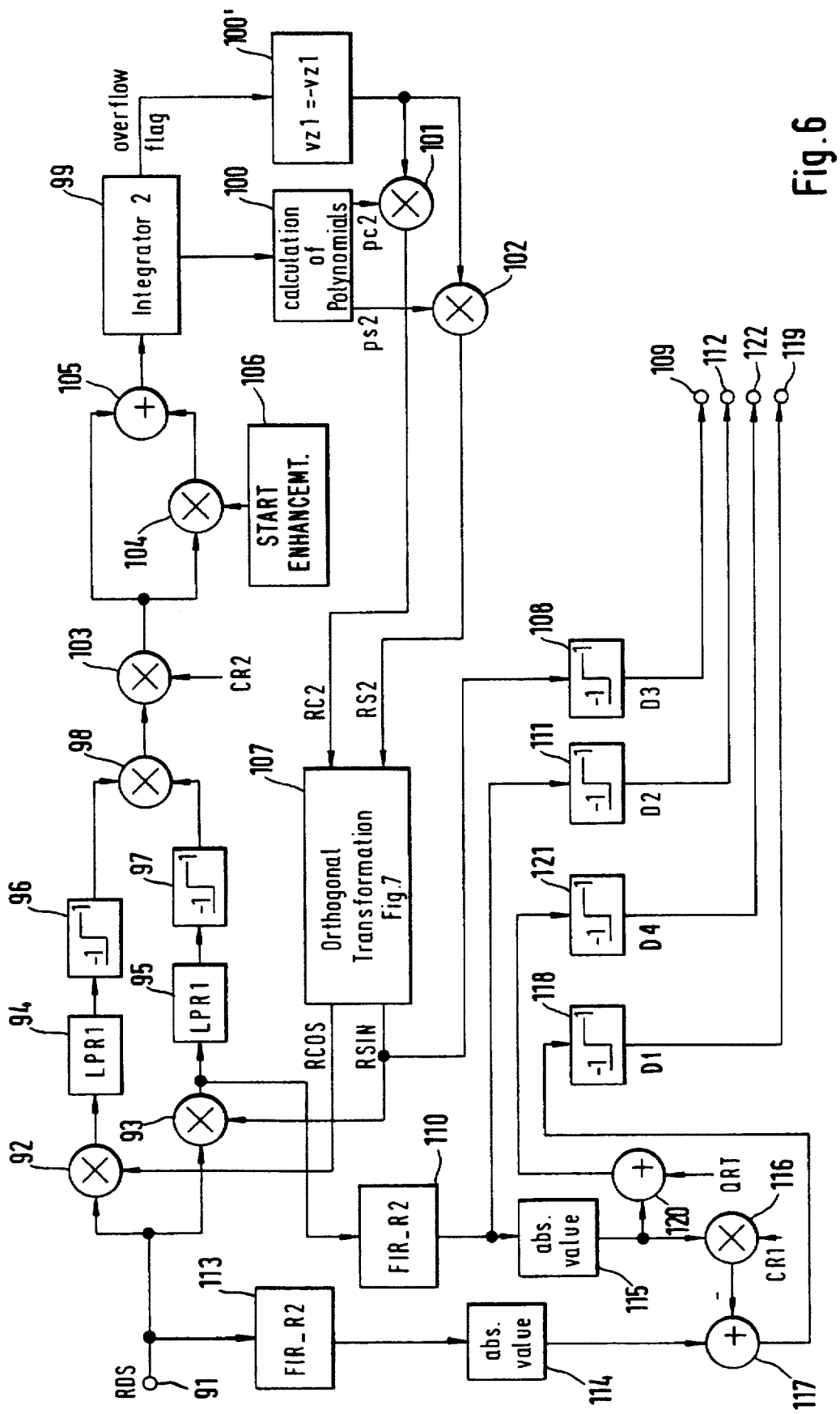

Via an input 91, the signal RDS from the phase control loop 3 (FIG. 1) is supplied to the RDS demodulator according to FIG. 6. Using a circuit that has become known as the Costas Loop, a carrier RSIN with the frequency 1.1875 kHz is generated that has the following phase position with respect to the carrier of the RDS modulation; in phase, or phase angle difference +180°. This loop is constructed as follows: First, the RDS signal is multiplied at 92, 93 by the generated carrier RSIN and the carrier RCOS, which is shifted 90° with respect to RSIN. The respective results of these multiplications are low-pass filtered at 94, 95 and supplied to another multiplier 98 via respective threshold circuits 96, 97. The output signal of multiplier 98 controls a sine/cosine generator, that is constructed like the cosine generator according to FIG. 4 of an integrator 99, a circuit 100 for calculating polynomials, a circuit 100' for switching the sign, and two multipliers 101, 102.

Prior to the output signal of multiplier 98 being supplied to integrator 99, it is multiplied at 103 by a constant CR2, which influences the loop amplification. To increase loop amplification at the beginning, a multiplier 104 and an adder 105 are provided as well. From a start enhancement circuit 106, multiplier 104 is supplied with a signal that is large at the start of synchronization and weakens thereafter. This causes faster stabilization of the phase control loop.

The signals RS2 and RC2, generated using the sine/cosine generators 99 through 102, are supplied to a circuit 107 for orthogonal transformation, which generates the two carriers RSIN and RCOS.

Carrier RSIN is transformed into a binary signal D3 via a threshold circuit 108 and supplied to circuit 5 (FIG. 1). To generate a signal D2, which contains the data, the result of the multiplication at 93 passes through an FIR (Finite Impulse Response) filter 110 and through a threshold circuit 111. The signal is then available at output 112 to be supplied to circuit 5 (FIG. 1). FIR filter 110 generates the mean value of the last eight sampling values (this corresponds to a bit period of the radio data signal of 1/1.1875 kHz).

Due to suppression of the subcarrier during transmission of the radio data signal (RDS), the 180° phase position of the demodulated signal is somewhat ambiguous. To correct a possible error of 180°, the RDS signal passes through another FIR filter 113 with eight sampling values as well. Then at 114, the absolute value is generated from the summed sampling values. The absolute amount is generated as well from the output signals of FIR filter 110 at 115. This absolute amount is multiplied by a constant CR1 at 116 and subtracted from the absolute value of the output signals of FIR filter 113 at 117. The result passes through a threshold circuit 118 and forms a signal D1, which is used to correct the 180° phase position. It can be supplied to circuit 5 (FIG. 1) from output 119. From the absolute value of the output signals of FIR filter 110, a signal D4 can be generated as well, using a subtractor circuit 120, which is supplied with a constant QRT, and a threshold circuit 121. Signal D4 indicates the quality of each received bit and is available at output 122.

Figure 7:
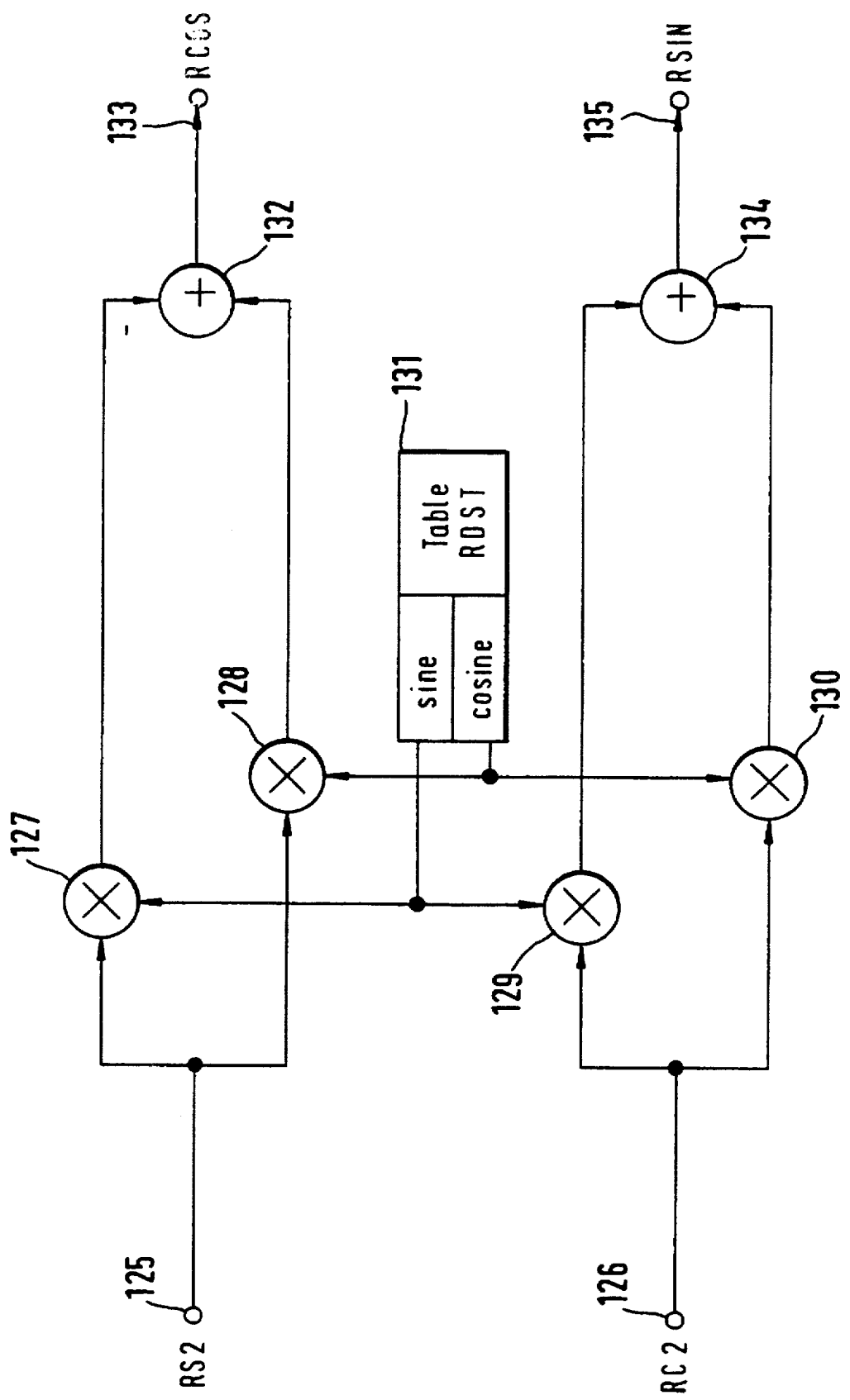

FIG. 7 shows an embodiment of a circuit 107 for orthogonal transformation. The two auxiliary signals from the sine/cosine generator 98 through 102 (FIG. 6) are supplied to inputs 125, 126, and from there each reaches two multipliers 127, 128 and 129, 130. In addition, function values of a sine carrier and a cosine carrier from a table 131 are supplied to the multipliers. A few sampling values per period are sufficient—in this example, eight sampling values. The output signals of multipliers 127, 128 are subtracted at 132, and form carrier RCOS at output 131. The output signals of multipliers 129, 130 are added at 134 and form carrier RSIN at output 135.

Figure 8:
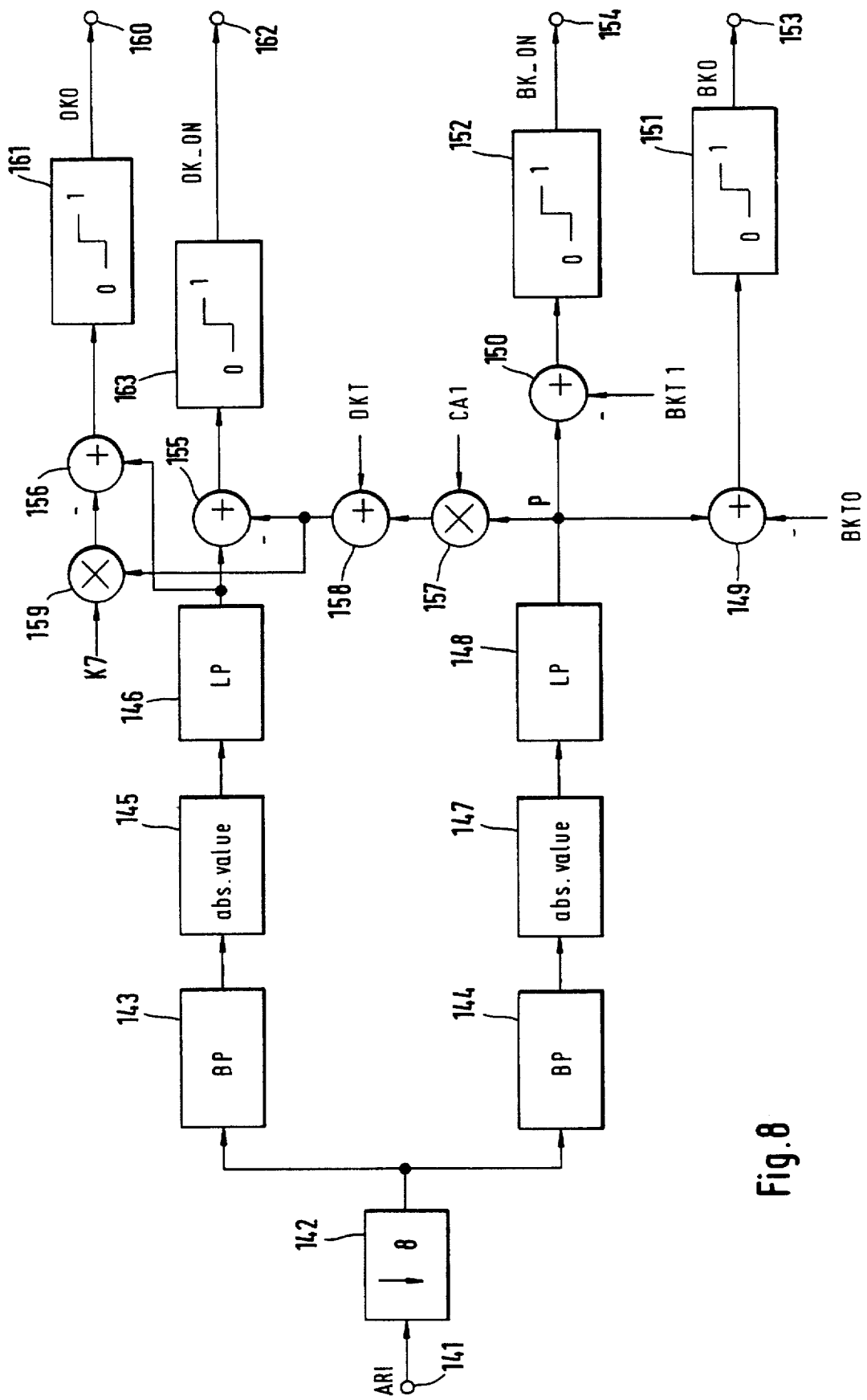

The traffic announcement demodulator according to FIG. 8 is supplied with the traffic announcement signal ARI at 141. After sampling rate reduction at 142 by a factor of 8, the ARI signal reaches two band pass filters 143, 144. Band pass filter 143 has a narrow band at 125 Hz, so that only the announcement recognition signal can pass the band pass filter. Thereafter, this signal is amplitude demodulated through an absolute value generator 145, followed by a low-pass filter 146.

Band pass filter 144 has a bandwidth of 20 Hz to 60 Hz and thus lets all region recognition signals pass. With the circuit as described, no selection of the individual ranges is carried out. It is only determined if region recognition is being transmitted. The output signal of bandpass filter 144 is amplitude demodulated well, using absolute value production 147 and a low-pass filter 148. From the demodulated recognition signals, two binary signals each are derived, whose level makes a 0 to 1 transition at various levels of the demodulated recognition signal. These levels, for instance 50% and 80% of a maximum value, are supplied as constants BKT0 and BKT1 to subtractors 149, 150, each being followed by a threshold circuit 151, 152. Signals BK0 and BK—ON can then be obtained at outputs 153, 154. These signals indicate that range recognition is received.

To be able to derive announcement recognition more or less independent of the received field strength, for announcement recognition, subtractors 155, 156 are supplied with a reference signal, which is dependent on the amplitude of the demodulated region recognition signal. For this purpose, the demodulated region recognition signal is first multiplied by a constant CA1 at 157, after which another constant DKT is added at 158.

The threshold for DK—ON recognition is dependent on the level of the BK recognition (and thus, on the level of the traffic announcement signal itself). The threshold value for DK—ON recognition is calculated as follows:

$$Threshold = CA1 \cdot P + DKT.$$

Prior to subtractor 156, the output signal of adder 158 is multiplied by a constant K7 at 159. Because of this, signal DK0 at output 160 of threshold circuit 161 already assumes the value 1 at a portion of the level, like signal DK—ON at output 162 of threshold circuit 163.

Various changes and modifications are possible within the scope of the inventive concept. In particular, features of one embodiment may be combined with features of another embodiment.

The respective constants SKT, CR2, CR1, QRT, CA1, DKT, and the various constants, K, K1 . . . K7, all can be freely chosen preferably between 0 and 1. Specific values of these constants are not relevant for the invention and cannot be given since the selection depends on the application, components, and other parameters. For example, the constant SKT represents a threshold value for a comparison with the absolute value of the received signals. This constant, thus, merely sets the sensitivity of the receiver for response to a traffic (ARI) signal SK. The constant, thus, can be selected, or manually set or selected, in accordance with use, and then pertaining reception conditions of the receiver. In dependence on the selection of the constant, the traffic signal SK appearing in the system can be generated, respectively, when the signal is weak, or only when it is relatively strong.

What is claimed is:

1. Circuit for a demodulator for a radio data signal in a radio receiver, where transmission of the radio data signal is carried out through phase shifting of at least one suppressed auxiliary signal (pc1, ps1) within a multiplex signal (MPX), comprising filter means (15) for band-pass filtering the multiplex signal, said filtering defining a base band;

means (18, 19) for obtaining, from the radio receiver, at a scanning clock rate produced by the radio receiver, reference carriers having two phase positions shifted 90° with respect to each other;

mixing means (16, 17) for mixing, into the base band, the filtered multiplex signal (MPX) in digital form and said reference carriers having said two phase positions shifted 90° with respect to each other, to thereby produce a first mix signal (wc) and a second mix signal (ws);

generating means (37) for producing a first and a second auxiliary signal (pc1, ps1) having, respectively, a cosine and a sine wave form;

first multiplying means (33, 34) for multiplying the first mix signal (wc) by said first auxiliary signal (pc1) and for multiplying the second mix signal (ws) by said second auxiliary signal (ps1) and deriving first and second multiplied signals;

adding means (38) coupled to receive the first and second multiplied signals and adding the first and second multiplied signals, and producing a first output signal (A1);

second multiplying means (35, 36) for multiplying the first mix signal (wc) by the second auxiliary signal (ps1) and for multiplying the second mix signal (ws) by the first auxiliary signal (pc1) and deriving third and fourth multiplied signals;

subtracting means (39) coupled to receive said third and fourth multiplied signals and forming the difference between the third and fourth multiplied signals, and thereby producing a second output signal (A2); and means for controlling the phase position of the first and second auxiliary signals (pc1, ps1) to cause the first output signal (A1) to correspond to the radio data signal (RDS) shifted down into the base band;

wherein said means for controlling said phase position comprises multiplying means (48) for multiplying the first output signal (A1) by the second output signal (A2) to obtain a third output signal (A3);

a plurality of low-pass filters (53, 54, 55) connected to have the first (A1) and the second (A2) and the third (A3) output signal each passed through a respective low-pass filter (53, 54, 55) and deriving first (H1), second (H2) and third filtered signals;

third multiplying means (56) for multiplying the first (H1) and the second (H2) low-pass filtered signals (H1, H2) by each other and deriving a multiplied signal (H4);

subtracting means (58) for subtracting the multiplied signal (H4) from the low-pass filtered third signal (H3); and a threshold circuit (59) receiving the result (H5) of the subtraction and generating a control voltage for said auxiliary signal generating means (37), producing said auxiliary signals (pc1, ps1).

2. Circuit according to claim 1, wherein the reference carrier is present as a 0, 1, 0, −1 . . . sequence of numbers for a sine phase position and as a 1, 0, −1, 0 . . . sequence of numbers for a cosine phase position.

3. Circuit according to claim 1, wherein the second output signal (A2) is a traffic broadcast signal in the baseband.

4. Circuit according to claim 3, wherein the result of the multiplication of the first and the second output signals (H1, H2), having passed through the low-pass filter (53, 55), is multiplied by a constant (n) prior to subtraction.

5. Circuit for a demodulator for a radio data signal in a radio receiver, where transmission of the radio data signal is carried out through phase shifting of at least one suppressed auxiliary signal (pc1, ps1) within a multiplex signal (MPX), comprising filter means (15) for band-pass filtering the multiplex signal, said filtering defining a base band;

means (18, 19) for obtaining, from the radio receiver, at a scanning clock rate produced by the radio receiver, reference carriers having two phase positions shifted 90° with respect to each other;

mixing means (16, 17) for mixing, into the base band, the filtered multiplex signal (MPX) in digital form and said reference carrier having said two phase positions shifted 90° with respect to each other, to thereby produce a first mix signal (wc) and a second mix signal (ws);

generating means (37) for producing a first and a second periodic auxiliary signal (pc1, ps1);

first multiplying means (33, 34) for multiplying the first mix signal (wc) by said first auxiliary signal (pc1) and for multiplying the second mix signal (ws) by said second auxiliary signal (ps1) and deriving first and second multiplied signals;

adding means (38) coupled to receive the first and second multiplied signals and adding the first and second multiplied signals, and producing a first output signal (A1);

second multiplying means (35, 36) for multiplying the first mix signal (wc) by the second auxiliary signal (ps1) and for multiplying the second mix signal (ws) by the first auxiliary signal (pc1) and deriving third and fourth multiplied signals;

subtracting means (39) coupled to receive said third and fourth multiplied signals and forming the difference between the third and fourth multiplied signals, and thereby producing a second output signal (A2); and means (53, 54, 55, 56, 57, 58) for controlling the phase position of the first and second auxiliary signals (pc1, ps1) to cause the first output signal (A1) to correspond to the radio data signal (RDS) shifted down into the base band;

said phase position control means comprising means for providing a control signal to said means (37) for generating at least one of said auxiliary signals (pc1, ps1), for controlling said at least one auxiliary signal in dependence on the provided control signal, wherein said control signal can assume two levels; and wherein said generating means (37) comprises a register (62), said register being incremented or decremented by clock signals having a frequency which is significantly higher than the frequency of the respective periodic signal to be generated, said register being, respectively, incremented or decremented in dependence on the level of the control signal;

and means (65) for calculating a function value from the respective content of the register (62) and generating said periodic auxiliary signals (pc1, ps1), wherein the value range which the content of the register (62) can assume corresponds to a half-period of the respective auxiliary signal (pc1, ps1) to be generated; and wherein, upon an overflow or underflow of the register (62), the sign of the calculated function value is changed.

6. The circuit of claim 5, wherein said means (65) for calculating the function value includes means (65) for calculating sinusoidal (ps1) and cosinusoidal (pc1) signals by polynomial calculation.

7. The circuit of claim 5, wherein the second output signal (A2) produces a traffic broadcast signal in the base band.

8. The circuit of claim 5, wherein said means for controlling the phase position of the first and second auxiliary signals (pc1, ps1) includes multiplying means (48) for multiplying the first output signal (A1) by the second output signal (A2) to obtain a multiplied third output signal (A3);

respective low-pass filters (53, 54, 55) through which the first (A1), the second (A2) and the third output signal (A3) each are conducted;

multiplying means for multiplying the first and the second low-pass filtered output signals (H1, H2) by each other and subtracting means (58) subtracting the multiplicand signal from the low-pass filtered third output signal (H3); and a threshold circuit (59) receiving the result (H5) of the subtraction and generating a control voltage for said auxiliary signal generating means (37), producing the periodic auxiliary signals (pc1, ps1).

9. The circuit of claim 6, wherein the reference carrier is present as a 0, 1, 0, −1 . . . sequence of numbers for a sine phase position and as a 1, 0, −1, 0 . . . sequence of numbers for a cosine phase position.

10. A method to demodulate a radio signal in a radio receiver, where transmission of the radio signal is carried out through phase shifting and at least one suppressed auxiliary signal within a multiplex (MPX) signal, comprising band-pass filtering the multiplex (MPX) signal, said filtering defining a base band;

obtaining, from the radio receiver, at a sampling clock rate produced by the radio receiver, a reference carrier having two phase positions shifted 90° with respect to each other;

mixing, into the base band, the filtered multiplex (MPX) signal, in digital form, with said reference carrier having said two 90° phase-shifted positions, to thereby produce a first mix signal (wc) and a second mix signal (ws);

generating a first periodic auxiliary signal (pc1) and a second periodic auxiliary signal (ps1);

multiplying, in a first multiplication step, the first mix signal (wc) by the first auxiliary signal (pc1) and multiplying the second mix signal (ws) by the second auxiliary signal (ps1);

adding the results of the multiplications of said first multiplication step and thereby producing a first output signal (A1);

multiplying, in a second multiplication step, the first mix signal (wc) by the second auxiliary signal (ps1) and the second mix signal (ws) by the first auxiliary signal (pc1);

forming the difference between the results of the multiplications of the first and second multiplication steps, and thereby producing a second output signal (A2); and controlling the phase position of said auxiliary signals (pc1, ps1) to cause correspondence of the first output signal (A1) to the radio data signal (RDS) shifted down into the base band;

and wherein the reference carrier is present as a 0, 1, 0, −1 . . . sequence of numbers for a sine phase position and as a 1, 0, −1, 0 . . . sequence of numbers for a cosine phase position.

11. The method of claim 10, wherein the periodic auxiliary signals are sinusoidal and cosinusoidal.

12. The method of claim 11, including the steps of calculating the function values of the sinusoidal and cosinusoidal signals by polynomial calculation.

13. A method to demodulate a radio signal in a radio receiver, where transmission of the radio signal is carried out through phase shifting and at least one suppressed auxiliary signal within a multiplex (MPX) signal, comprising band-pass filtering the multiplex (MPX) signal, said filtering defining a base band;

obtaining, from the radio receiver, at a sampling clock rate produced by the radio receiver, a reference carrier having two phase positions shifted 90° with respect to each other;

mixing, into the base band, the filtered multiplex (MPX) signal, in digital form, with said reference carrier having said two 90° phase-shifted positions, to thereby produce a first mix signal (wc) and a second mix signal (ws);

generating a first periodic auxiliary signal (pc1) and a second periodic auxiliary signal (ps1);

multiplying, in a first multiplication step, the first mix signal (wc) by the first auxiliary signal (pc1) and to form a first product, and multiplying the second mix signal (ws) by the second auxiliary signal (ps1) to form a second product;

adding the first product and the second product and thereby producing a first output signal (A1);

multiplying, in a second multiplication step, the first mix signal (wc) by the second auxiliary signal (ps1) to form a third product, and the second mix signal (ws) by the first auxiliary signal (pc1) to form a fourth product;

forming the difference between the third and fourth product, and thereby producing a second output signal (A2); and controlling the phase position of said auxiliary signals (pc1, ps1) to cause correspondence of the first output signal (A1) to the radio data signal (RDS) shifted down into the base band;

and wherein the step of controlling the phase position of the first and second auxiliary signals (ps1, pc1) comprises providing a control signal (US) which can assume two levels;

incrementing or decrementing the content of a register (62) by clock signals which have a frequency which is significantly higher than the frequency of the respective auxiliary signal to be generated; and calculating a function value from the respective content of the register (62), wherein the value range, which the content of the register can assume, corresponds to a half-period of the signal to be generated, and wherein the sign of the calculated function value changes at each overflow and underflow of the register (62), and controls said first and second auxiliary signals.

14. The method of claim 13, wherein the step of generating the periodic auxiliary signals comprises generating sinusoidal and cosinusoidal signals to form, respectively, said first and second auxiliary signals (pc1, ps1).

15. The method of claim 14, wherein the step of calculating the function values of the sinusoidal and cosinusoidal signals includes polynomial calculation.

* * * * *

UNITED STATES PATENT AND TRADEMARK OFFICE
CERTIFICATE OF CORRECTION

PATENT NO. : 5,521,944
DATED : May 28, 1996
INVENTOR(S) : Wilhelm HEGELER et al.

It is certified that error appears in the above-indentified patent and that said Letters Patent is hereby corrected as shown below:

On the Title Page,
under Item [30] "Foreign Application Priority Data", "43 18 624.4" should be --43 18 642.4--.

Signed and Sealed this

Tenth Day of December, 1996

Attest:

BRUCE LEHMAN

Attesting Officer   Commissioner of Patents and Trademarks